Figure 1:
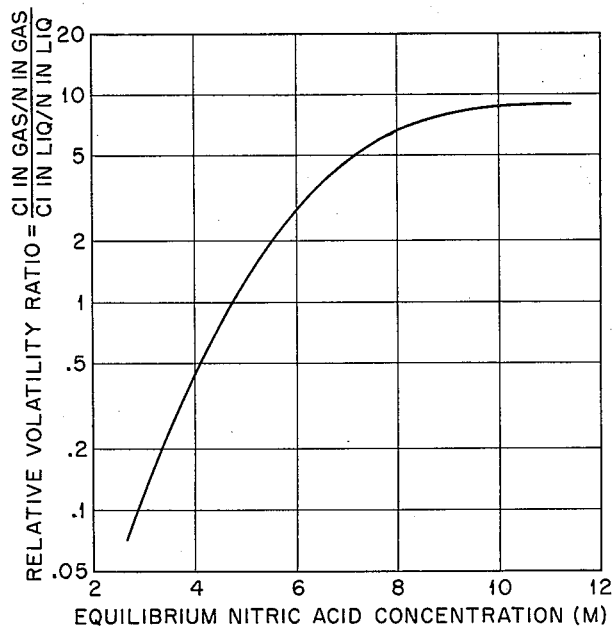

INVENTOR.
Jouko E. Savolainen
BY Roland A. Anderson
ATTORNEY

United States Patent Office 3,075,825
Patented Jan. 29, 1963

3,075,825
LOW TEMPERATURE PROCESS FOR THE REMOVAL AND RECOVERY OF CHLORIDES AND NITRATES FROM AQUEOUS NITRATE SOLUTIONS
Jouko E. Savolainen, Oak Ridge, Tenn., assignor to the United States of America as represented by the United States Atomic Energy Commission
Filed Oct. 4, 1960, Ser. No. 60,525
4 Claims. (Cl. 23—14.5)

This invention relates generally to a process for preparing a relatively non-corrosive aqueous nitrate feed solution from which fissionable and/or fertile values contained in said solution can be separated by liquid-liquid solvent extraction techniques. More particularly, it relates to a process for removing and recovering chlorides and nitrates from acidic aqueous solutions derived from the dissolution of neutronic reactor fuel elements in aqueous mixtures of nitric and hydrochloric acid.

A number of nuclear power reactors that are now in operation or under construction use stainless steel as a cladding material and/or alloying material for the fuel elements. The fuel elements for these reactors may comprise a core consisting of uranium metal, mixtures or alloys of uranium with such refractory metals as molybdenum and silicon or a cermet of uranium oxide and stainless steel, said core being clad with and/or bonded to stainless steel. Since such fuel elements have only a limited useful reactor life, during which only a small fraction of the fuel is burned, and since the unburned portion of the fuel constitutes an economical nuclear fuel source, it is necessary to process the spent fuel to separate and recover valuable fissionable and fertile values and new fuel bred from fertile material.

A particularly useful method of separating, decontaminating and recovering such values involves the use of solvent extraction techniques in which an aqueous nitrate solution formed by the dissolution of a spent reactor fuel element is contacted with an aqueous immiscible organic solvent to selectively extract fissionable and fertile values therefrom. Mixtures of nitric acid and hydrochloric acid are excellent dissolution agents for such corrosion and oxidation resistant alloys as stainless steel and metals such as molybdenum and silicon. Unfortunately, the resulting chloride-containing solution is extremely corrosive to stainless steel, the material most commonly used in subsequent solvent extraction equipment, and to other chloride-sensitive metals. The high corrosivity of nitric-hydrochloric acid mixtures is attributable to the relatively high concentration of chloride ions. As a practical matter, the chloride ion concentration of the nitrate solution must be reduced to a non-corrosive level before any subsequent solvent extraction operations are attempted.

Prior to the present invention, methods for reducing the chloride content of aqueous nitrate solutions to a relatively non-corrosive level involved high temperature fractional distillation techniques. For example, in U.S Patent 2,919,972, of common assignee, a chloride removal process is described in which chlorides, in the form of an HCl-containing vapor, are fractionally distilled at elevated temperatures from nitric acid-hydrochloric acid mixtures adjusted to a nitric acid concentration of from 12 to 15.2 molar. This process, while it is effective to reduce the chloride concentration in nitrate solutions to a relatively non-corrosive level, is disadvantageous in several respects when viewed in the context of aqueous nuclear fuel reprocessing technology. Firstly, the chloride removal operation is carried out at boiling temperature, necessitating expensive heat requirements. Secondly, a boiling solution of nitric acid, even though essentially chloride free, is nevertheless a highly corrosive medium. Thirdly, a boiling solution of 12–15 molar nitric acid is likely to nitrate any organic matter dissolved or dispersed in solution, thus creating a potentially explosive and therefore hazardous mixture. Since dissolution of reactor fuels is but the initial step in a total process of separating and recovering nuclear fuels from aqueous solutions, it is obvious that an intermediate chloride removal process is a technically necessary, but inherently uneconomical, operation. A high temperature chloride removal process only multiplies the expense still further.

An additional problem arising with respect to the formation of nitrate solutions from nuclear fuels is that the amount of nitric acid required to dissolve a given fuel element and achieve effective chloride removal is generally far in excess of the amount of nitrate which can be tolerated in subsequent solvent extraction operations. While simple evaporation followed by dilution with water can produce the required nitrate concentration, it has been found that the residual concentrated nitrate solution left after evaporation can be, in addition to being extremely corrosive, a highly reactive mixture.

It is, therefore, a principal object of this invention to provide a process for effectively and economically removing and recovering chlorides and nitrates from aqueous chloride-containing solutions derived from the dissolution of neutronic reactor fuel elements in aqueous mixtures of nitric and hydrochloric acid.

Another object of this invention is to provide a simplified method of reducing the chloride content of aqueous nitrate solutions resulting from the dissolution of nuclear fuel elements to a relatively non-corrosive level. Another object of this invention is to provide a relatively non-corrosive aqueous nitrate solution containing fissionable and/or fertile metal values which can be recovered from said solution by liquid-liquid solvent extraction techniques. A further object of this invention is to provide a self-contained cyclic process for the recovery, concentration, and recycle of chlorides and/or nitrates from acidic aqueous nitrate chloride-containing solutions used to dissolve neutron-irradiated nuclear reactor fuel elements. A further object of this invention is to provide method of forming relatively non-corrosive aqueous nitrate solvent extraction feed solution from a solid neutronic reactor fuel element containing fissionable and/or fertile metal values.

Other objects and advantages will be apparent from the ensuing description.

For the sake of clarity the invention will be described in connection with its two aspects, that is, as a chloride removal and recovery process and as a nitrate removal and recovery process. It will be apparent, however, that as the description proceeds, that the integration of both aspects provides a unitary process, whereby the benefits of both aspects may be combined with advantage.

With respect to that aspect of the invention involving the reduction of the chloride content of an aqueous nitrate solution containing chloride values, the invention comprises increasing the volatility of said chloride values relative to the volatility of nitrogen values in said solution by the steps which comprise maintaining the nitric acid concentration in said solution at at least about 5 molar, countercurrently contacting said solution at atmospheric pressure and at a temperature between the boiling point of nitrocyl chloride and the decomposition temperature of nitrous acid in said solution with an oxide of nitrogen wherein the atomic ratio of oxygen to nitrogen is at least equal to one, and thereafter recovering the gas above said solution in substantial equilibrium therewith.

By the use of this aspect of the invention chloride ions may be removed from an aqueous nitrate solution leaving a relatively non-corrosive solution of nitrate salts. By the term "relatively non-corrosive" is meant a solution which, after treatment in accordance with the method of this invention, will not corrode stainless steels. As a consequence, a mixture of nitric and hydrochloric acids may be used to dissolve nitric acid insoluble metals and after suitable treatment provide a solution which is non-corrosive to stainless steels.

In practicing this invention the material from which metal values are to be recovered is dissolved in an aqueous mixture of nitric acid and hydrochloric acid. The acid concentration to be used in the dissolution step is not critical, and may be determined by considerations such as the desired dissolution rate and the desired chloride concentration in the resulting solution. An aqua regia solution (one volume of 16 molar nitric acid and 4 volumes of 12 molar hydrochloric acid) is usable, but such high concentrations of acid lead to excessive reaction rates, excessively high chloride content of the resulting solution, and excessive gas formation resulting from mutual decomposition of the concentrated acid mixture. It has been found that more dilute solutions provide an effectively rapid dissolution rate without the concomitant disadvantages encountered with more concentrated solutions. Thus, an acidic solution approximately 2 to 2.5 molar in hydrochloric acid and 4 to 6 molar in nitric acid has been found to provide a high dissolution rate with minimum acid decomposition.

The resulting acidic aqueous solution containing dissolved metal values is then cooled to room temperature and adjusted to a nitric acid concentration in the range 5 to 10 molar. This may be done by adding nitric acid to the solution or by adding a nitrogen oxide selected from the group nitrogen dioxide, dinitrogen trioxide, and dinitrogen tetroxide. After the solution has been adjusted to at least 5 molar in nitric acid, it is countercurrently contacted with at least one gaseous oxide of nitrogen having an oxygen-to-nitrogen ratio at least equal to one at a temperature below the decomposition temperature of nitrous acid in solution and above the boiling point of nitrosyl chloride. Under these conditions, the resulting gas above the solution and in equilibrium therewith will be enriched in chloride relative to the concentration of chloride in the liquid phase and, by continuously removing a portion of the gaseous phase while continuously contacting the nitrate solution with the selected nitrogen oxide, the chloride content of the solution will be reduced to a non-corrosive level. I have found, for example, that a solution originally 2–3 molar in hydrochloric acid can be reduced to a solution having a chloride concentration of about 20 parts per million, based on the total weight of solution.

The characteristic feature of this invention which makes it operable to volatilize chlorides under essentially room temperature conditions is evident from FIG. 1, which is a graph which shows the relative volatility ratio as a function of the nitric acid concentration in a nitric acid-hydrochloric acid-water system at one atmosphere pressure, where the relative volatility ratio is defined as:

$$\frac{\text{Chloride in gas/nitrogen in gas}}{\text{Chloride in liquid/nitogen in liquid}}$$

It will be seen that the volatility ratio does not exceed a value of 1 until the solution is about 5 molar in nitric acid. It then reaches a maximum value in solutions 8–10 molar in nitric acid.

It is essential for the successful operation of this invention that the chloride removal operation be conducted at or about room temperature. More specifically, chloride removal should be conducted at a temperature somewhat above the boiling point of nitrosyl chloride (about 20° C.) and below the decomposition point of the nitrous acid in solution (about 30° C.). I have found that if the chloride removal step is attempted outside the stipulated temperature range, the efficiency of the process is sharply reduced.

While it will be evident that the nitric acid-hydrochloric acid-water-chemical system involved in this invention consists of a complex variety of molecular and ionic species, the effectiveness of operating within the stated limitations of nitric acid concentration and temperature for the purpose of chloride removal may be explainable by the following equations:

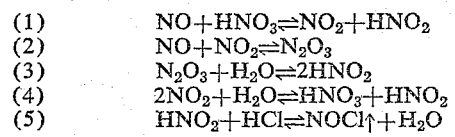

(1)          $NO + HNO_3 \rightleftharpoons NO_2 + HNO_2$
(2)          $NO + NO_2 \rightleftharpoons N_2O_3$
(3)          $N_2O_3 + H_2O \rightleftharpoons 2HNO_2$
(4)          $2NO_2 + H_2O \rightleftharpoons HNO_3 + HNO_2$
(5)          $HNO_2 + HCl \rightleftharpoons NOCl\uparrow + H_2O$ A consideration of the above equations indicates that the controlling feature which makes the process operable at room temperature is the reaction of nitrous acid with hydrochloric acid in solution. Equations 1–4 show the reactions leading to an overexcess of nitrous acid in order to drive the reaction expressed by Equation 5 to completion in favor of nitrosyl chloride formation. The resulting gaseous phase, which is enriched with chloride values (as nitrosyl chloride) relative to that existing in the liquid phase, also contains a mixture of nitrogen oxides and some water vapor.

Figure 2:
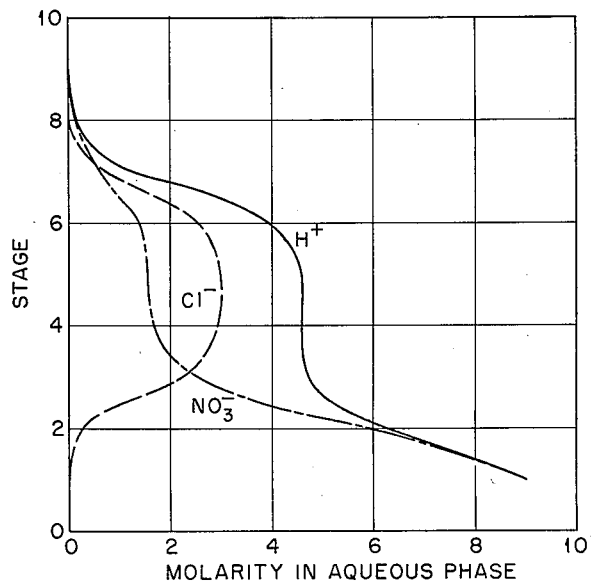

An important aspect of this invention consists in the treatment of the vaporized chloride values in a manner to form a hydrochloric acid solution suitable for reuse in dissolving fuel elements. In order to accomplish this, the chloride vapor above the chloride solution is passed to a column in intimate countercurrent contact therein with a downwardly flowing water stream to hydrolyze the nitrosyl chlorides to hydrochloric acid. The chloride values will concentrate at an intermediate position between the ends of the column. The concentration of chloride values, as HCl, is well illustrated in FIG. 2 which shows the concentration profile of chlorides, nitrate and hydrogen ions in a column consisting of ten theoretical stages where the chloride-containing vapor resulting from the previously described chloride removal step was passed upwardly through a multi-stage bubble cap column countercurrently to a downwardly flowing stream of water. As seen in FIG. 2, the chloride values concentrate in the region corresponding to the middle theoretical stages. A side stream taken from this region is then sent to storage whence it can be cycled to the dissolver vessel where it is combined with nitric acid to reform the required dissolution medium.

The aqueous nitrate solution which by now has been reduced to a relatively non-corrosive level, can now be adjusted to serve as the aqueous feed in a solvent extraction process. This solution will generally be over-concentrated in the amount of nitrate requirements necessary for efficient solvent extraction of fissionable and fertile values. It is therefore necessary to remove a substantial portion of the nitric acid. One obvious way of removing the nitrates from solution is by evaporation. However, if this is done, a highly-corrosive, constant-boiling residual mixture about 12–15 M in nitric acid may result, to which sufficient water must be added to form the solvent extraction feed solution. A highly concentrated boiling nitric acid mixture of this kind may nitrate organic materials in contact therewith and thus produce a potentially explosive polynitrated mixture subsequent to the solvent extraction step.

In order to avoid this potentially dangerous condition, I propose to reduce the nitrate content of the solution by contacting said solution at a temperature ranging from room temperature to the reflux temperature of said solution with gaseous nitric oxide to thereby volatilize a desired amount of nitrates. By contacting with nitric oxide, the following principal reactions are considered to take place:

(6) $NO + HNO_3 \rightarrow NO_2\uparrow + HNO_2$
(7) $2NO + 4HNO_3 \rightarrow 3N_2O_3\uparrow + 2H_2O$ The resultant overhead gases, which will consist principally of the nitrogen oxides $NO_2$ and $N_2O_3$ and some water vapor, is then contacted preferably countercurrently, with a stream of water to regenerate nitric acid which can be reused as needed to dissolve additional fuel elements. By this means of reducing the nitrate content, the formation of a highly concentrated nitrating mixture, and the attendant hazards, are avoided. Moreover, this method is especially advantageous in the context of that phase of the invention involving the reduction of the chloride content of the nitrate solution. It will be noted the NO necessary for nitrate reduction constitutes a feed as well as a by-product of the chloride reduction operation and vice versa. Hence, a cyclic chloride removal process integrated with a nitrate removal process can be operated with maximum economy and efficiency in a number of ways which will be obvious to those skilled in the chemical engineering art.

The actual means of contacting the nitrate solution with NO may be by means of a simple sparging with NO. For maximum continuous efficiency, however, it is preferred to employ a multistage column wherein a descending nitrate solution is continuously and countercurrently contacted with a rising stream of gaseous NO. In applying this invention to the preparation of a solvent extraction feed solution, consideration should be given to the fact that the presence of nitrites in solution can have a deleterious effect on the efficiency of solvent extraction. It is, therefore, preferable to conduct the NO-nitrate solution reaction for a short time at the reflux temperature of the solution to decompose any nitrites which may be present.

Figure 3:
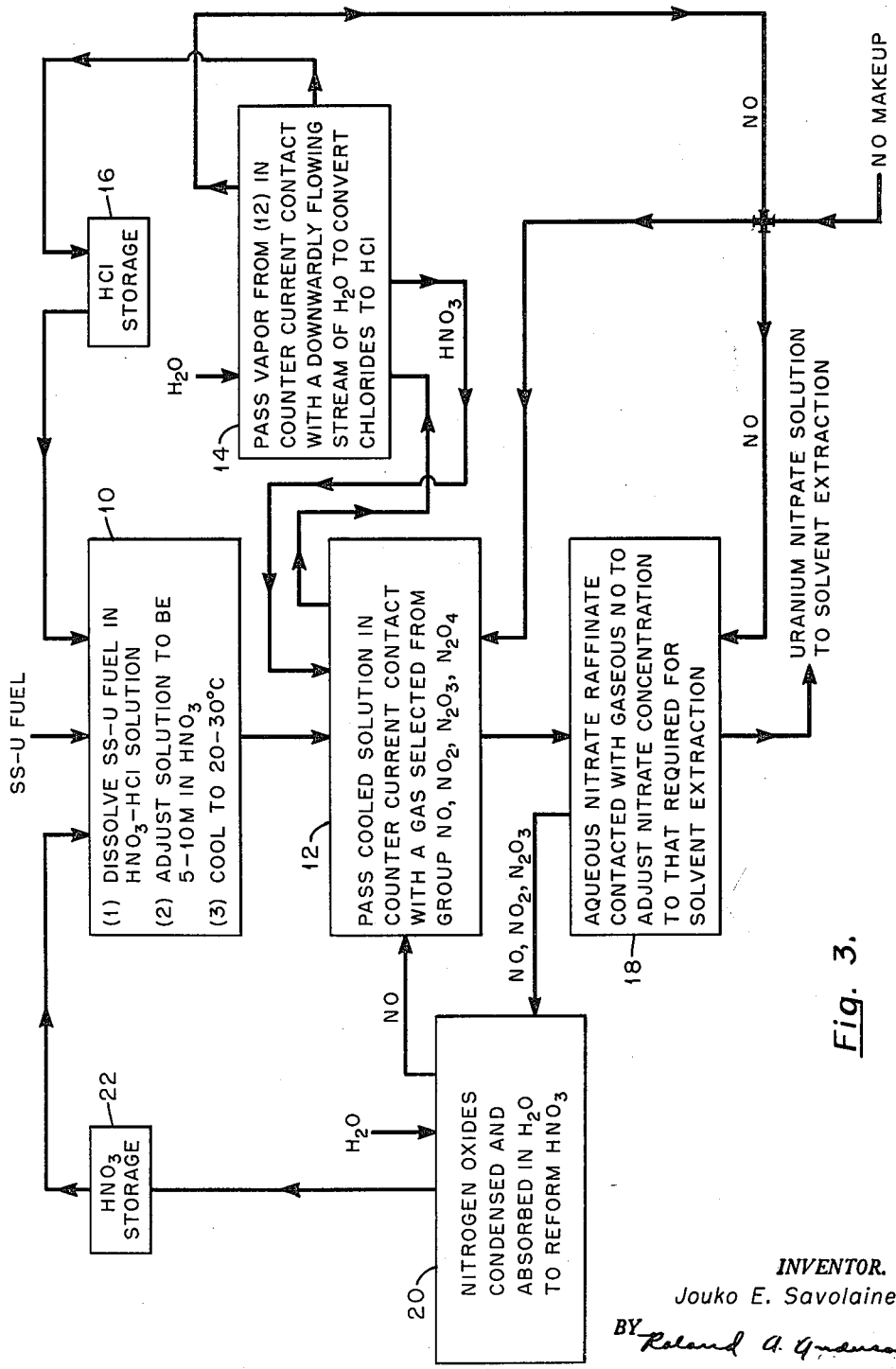

In further description, reference will now be made to FIG. 3 which is a descriptive flow sheet of a typical process employing the method of this invention. Such apparatus as valves and pumps are not shown as their proper selection and placement can be determined by those skilled in the art in the light of the accompanying description. As shown in FIG. 3, a stainless steel-clad uranium-cored fuel element is contacted with a mixture of nitric acid and hydrochloric acid in a dissolver zone 10 to effect rapid and complete dissolution of the entire fuel element. The dissolver vessel and other apparatus in contact with corrosive concentrations of chlorides should be constructed of such materials as titanium, tantalum or glass-lined steel. Stainless steel is suitable for equipment in contact with relatively non-corrosive solutions, that is, solutions in which the chloride content has been reduced to a non-corrosive level. The resulting uranyl nitrate-containing solution is cooled to room temperature and adjusted to a nitric acid concentration in the range 5–10 molar but preferably in the range 8–10 molar. The cooled solution is then flowed downwardly through a multistage bubble cap column 12 in intimate countercurrent contact therein with an upwardly flowing nitrogen oxide gas selected from the group NO, $NO_2$, $N_2O_3$, $N_2O_4$ at a temperature not exceeding the decomposition temperature of nitrous acid. Any one or combination of these aforementioned gases may be used, the choice depending principally on cost, ease of handling and recycling. The overhead gas from column 12 which contains chlorides, principally as nitrosyl chloride, is passed to a chloride recovery column 14 in countercurrent contact therein with a downwardly flowing stream of water.

In the chloride recovery column 14, the nitrosyl chloride is hydrolyzed by the water to hydrochloric acid, NO and $NO_2$, these being absorbed by the water and converted to nitric acid. After any air in column 14 has been displaced, any further NO generated by the hydrolysis of nitrosyl chloride will pass through the column 14 and may be cycled to the chloride strip column 12 for reuse there or may be cycled to the chloride-free nitrate solution in zone 18, in contact therein with said solution to reduce its nitrate content. The resultant hydrochloric acid in column 14 is then passed therefrom by a side stream placed preferably at a point at or near where the hydrochloric acid content is maximum. This point can be determined by proper calibration of the separation stages of the column having reference, for example, to FIG. 2. The side stream of hydrochloric acid is then passed to a hydrochloric acid collection tank 16 to be reused as needed to reform fresh dissolver solution. Nitric acid is recovered from the bottom of column 14 to be recycled to column 12 where it serves to increase the nitric acid content of the solution therein to the required molarity. The raffinate liquid in column 12 is now relatively non-corrosive with respect to stainless steel and is received in zone 18. Recovery of excess free nitric acid is accomplished by contacting the raffinate liquid with gaseous NO cycled from column 14 and/or from a source of NO makeup. The resultant nitrogen oxide vapors are received in an absorption zone 20 where the nitrogen oxides are absorbed in water to reform nitric acid, and thence to nitric acid storage tank 22 to be recycled to dissolver 10 as needed to reform fresh dissolver solution.

The nitrate adjusted uranyl nitrate solution in zone 18 can now be cycled as a feed solution to a liquid-liquid solvent extraction operation where uranium and other fissionable and/or fertile values can be selectively extracted by a selective organic solvent such as ethyl ether, methyl isobutyl ketone or tributyl phosphate in a kerosene solvent. A method of separating uranium, plutonium, and fission products from a nitrate solution is described in U.S. Patent 2,811,415; a solvent extraction process for the separation of thorium from a nitrate solution is described in U.S. Patent 2,796,320.

While the invention has been described with reference to its most useful application as an integrated process for treating a stainless steel nitrate-chloride solution to reduce the chloride content to a non-corrosive level and to reduce the nitrate level in a hazard-free operation, it will be obvious that the several aspects of this invention may be used separately for chloride removal or for nitrate removal. In such cases, of course, the advantages of an integral, cyclic process where the by-product of chloride removal serves as the feed for nitrate removal, and wherein the radioactivity of the system is confined within a single process system, are not realized.

The nitrate removal aspect of this invention may be applied with advantage to the aqueous raffinate resulting from solvent extraction of the aqueous solvent extraction feed solution. This raffinate will contain a large variety of fission products, some of which are highly volatile, such as ruthenium and iodine. It is desirable to reduce the volume of such radioactive solutions to a minimum. Evaporation of such a solution could lead to a highly explosive mixture since the aqueous raffinate has a relatively large amount of organic solvent either dissolved or dispersed therein which would be subject to nitration by the resultant highly nitrating mixture. Yet by simply sparging the aqueous raffinate with gaseous NO at room temperature, the solution can be reduced to a minimal volume under non-hazardous conditions. Moreover, since NO is an effective reducing reagent to convert the highly radioactive ruthenium and iodine fission products to non-volatile species, this method has the additional advantage of yielding a substantially fission-product-free off-gas. Many other applications of this invention either as a chloride removal process and/or as a nitrate removal process, will be readily deducible from the above description, and thus within the scope of this invention.

Having thus described my invention, I claim:

1. In a process for recovering fissionable and fertile values from a neutron-irradiated stainless steel clad nuclear fuel element containing said values in which the initial step of said process consists of dissolving said fuel element in a corrosive chloride-containing nitric acid solution, the improvement which comprises reducing the chloride content of said solution to a non-corrosive level with respect to stainless steel by the steps which comprise adjusting said solution to a nitric acid concentration in the range 5–10 molar, passing said adjusted solution, at a temperature in the range 20–30° C., in countercurrent contact with a gaseous oxide of nitrogen having an oxygen-to-nitrogen ratio at least equal to one to thereby produce a stainless steel corrosion resistant nitrate solution containing said fissionable and fertile values, reducing the molarity of nitric acid of said corrosion resistant solution by passing gaseous nitric oxide therethrough to form a solvent extraction feed solution and recovering fissionable and fertile values therefrom.

2. The method according to claim 1, wherein the nitrogen oxide is selected from the group consisting of nitric oxide, nitrogen dioxide, dinitrogen trioxide, and dinitrogen tetroxide.

3. The method according to claim 1, wherein the dissolvent solution is adjusted to a nitric acid concentration in the range 8–10 molar.

4. In a process for recovering fissionable and fertile values from a neutron-irradiated nuclear fuel element containing said values in which the initial step of said process consists of dissolving said fuel element in a corrosive chloride-containing nitric acid solution, the improvement which comprises reducing the chloride content of said solution to a non-corrosive level with respect to stainless steel by the steps which comprise adjusting said solution to a nitric acid concentration in the range 5–10 molar, passing said adjusted solution, at a temperature in the range 20–30° C., in countercurrent contact with a gaseous oxide of nitrogen having an oxygen-to-nitrogen ratio at least equal to one to thereby produce a nitrate solution which is corrosion resistant to stainless steel and contains said fissionable and fertile values, cycling the resultant chloride-containing vapor in countercurrent contact with water to thereby convert said chlorides to hydrochloric acid and nitric oxide, passing said nitric oxide in contact with said corrosion resistant nitrate solution at a temperature in the range from room temperature to the reflux temperature of said contacted solution to thereby reduce the molarity of nitric acid in said stainless steel corrosion resistant solution and form an off-gas consisting principally of nitrogen dioxide and dinitrogen trioxide, absorbing said off-gas into water to regenerate nitric oxide and nitric acid, recycling said nitric oxide and nitric acid, and thereafter recovering said fissionable and fertile values.

References Cited in the file of this patent

UNITED STATES PATENTS

| | | |
|---|---|---|
| 1,717,951 | Taylor | June 18, 1929 |
| 1,901,816 | Luscher | Mar. 14, 1933 |
| 2,240,668 | Reed | May 6, 1941 |
| 2,919,972 | Hymon et al. | Jan. 5, 1960 |

OTHER REFERENCES

Culler et al.: "2nd Geneva Conference on Peaceful Uses of Atomic Energy," vol. 17, pp. 279–282, Sept. 8–13, 1958.

Shefcik: AEC Document HW–62537, pp. 1, 2, 6, 7, 8, 10, Oct. 29, 1959.